United States Patent
Kerekes (10) Patent No.: US 12,367,800 B2
(45) Date of Patent: Jul. 22, 2025

(54) ACTIVE OFF-AXIS ANGLE CORRECTION FOR IMAGE-BASED LIGHTING

(71) Applicants: Sony Group Corporation, Tokyo (JP); Sony Pictures Entertainment Inc., Culver City, CA (US)

(72) Inventor: Joshua Kerekes, Toronto (CA)

(73) Assignees: SONY GROUP CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

(21) Appl. No.: 18/528,185

(22) Filed: Dec. 4, 2023

(65) Prior Publication Data
US 2024/0185756 A1    Jun. 6, 2024

Related U.S. Application Data (60) Provisional application No. 63/386,140, filed on Dec. 5, 2022.

(51) Int. Cl.
*G09G 5/02*    (2006.01)
*F16M 11/10*   (2006.01)
(Continued)

(52) U.S. Cl.
CPC ......... *G09G 3/2007* (2013.01); *F16M 11/105* (2013.01); *F16M 11/18* (2013.01);
(Continued)

(58) Field of Classification Search
CPC ................... G09G 3/2007; G09G 3/32; G09G 2320/0233; G09G 2320/0242;
(Continued)

(56) References Cited

U.S. PATENT DOCUMENTS 6,111,243 A    8/2000   Lara
6,177,955 B1   1/2001   Downen
(Continued)

FOREIGN PATENT DOCUMENTS

| CN | 105976006 A   | 9/2016  |
|----|---------------|---------|
| TW | 202108102 A   | 3/2021  |
| WO | 2021244525 A1 | 12/2021 |

OTHER PUBLICATIONS

ANONYMOUS: "Lidar—Wikipedia", Nov. 6, 2022, XP093131611, Retrieved from the Internet: [retrieved on Feb. 14, 2024].
(Continued)

*Primary Examiner* — Abdul-Samad A Adediran
(74) *Attorney, Agent, or Firm* — Procopio, Cory, Hargreaves & Savitch LLP (57) ABSTRACT

Correcting an image rendered on a display for a target, including: an object tracking device to measure a relative position to the target; a configuration file including at least a list of target angles to rotate the display in relation to the relative position of the object tracking device; a measurement control system to ingest the configuration file, the measurement control system to initiate a sequence by tracking stability display while displaying a grey scale value of the target that is a basis for subsequent angular measurements; and a goniometric rotational device including a pair of servo motors to place a point of rotation on an axis aligned surface normal of the display.

18 Claims, 8 Drawing Sheets

(51) Int. Cl.
*F16M 11/18* (2006.01)
*F16M 11/20* (2006.01)
*G09G 3/20* (2006.01)
*G09G 3/32* (2016.01)

(52) U.S. Cl.
CPC ........... *F16M 11/2014* (2013.01); *G09G 3/32* (2013.01); *G09G 2320/0233* (2013.01); *G09G 2320/0242* (2013.01); *G09G 2320/0626* (2013.01); *G09G 2320/0666* (2013.01); *G09G 2360/16* (2013.01)

(58) Field of Classification Search
CPC ... G09G 2320/0626; G09G 2320/0666; G09G 2360/16; G09G 3/006; F16M 11/105; F16M 11/18; F16M 11/2014; G06V 10/25
USPC ........................................................ 345/589
See application file for complete search history.

(56) References Cited

U.S. PATENT DOCUMENTS

2003/0117414 A1\* 6/2003 Sasaki .................... G09G 3/006
                                                      345/589
2024/0038149 A1\* 2/2024 Itoh ........................ G06V 10/25

OTHER PUBLICATIONS

Michael E Becker: "Flache Fernsehbildschirme: sehen, messen und bewerten", Berlin, DE, Dec. 1, 2011, vol. 65, No. 12.

\* cited by examiner

ACTIVE OFF-AXIS ANGLE CORRECTION FOR IMAGE-BASED LIGHTING

CROSS-REFERENCE TO RELATED APPLICATIONS

This application claims the benefit of priority under 35 U.S.C. § 119 (e) of U.S. Provisional Patent Application No. 63/386,140, filed Dec. 5, 2022, entitled "Active Off-Axis Angle Correction for Display Devices". The disclosure of the above-referenced application is incorporated herein by reference.

BACKGROUND

Field

The present disclosure relates to correcting display technology brightness and color uniformity. Specifically, to calibrating and dynamically correcting displayed imagery deviations when a display is utilized as a light source to illuminate a subject or when the display is photographed directly from varying angles.

Background

Current lighting fixtures and direct display devices employing various wavelength light emitting diodes (LEDs) face a substantial challenge including an evident chromaticity shift and luminance falloff when light propagates off-axis from the orientation of the LEDs. These off-axis deviations result in a noticeable and undesirable variance in the emitted light's color quality, as perceived by an observer or as it illuminates the subject. Such chromaticity deviations not only affect the visual consistency and aesthetic appeal but also impact the functional effectiveness of these devices in applications where precise color representation is critical and preservation of the creative intent is the main priority. Conventional ways to address the above-described issues included providing an acceptable viewing and beam angle or maximum angular range of the emission angle. Accordingly, a need exists for methods and systems that can solve imagery deviation issues when lighting a subject outside the optimal emission angle or photographing the display from off-axis angles.

SUMMARY

The present disclosure implements techniques for calibrating and dynamically correcting displayed imagery deviations when a display is utilized as a light source to illuminate a subject or when the display is photographed directly from varying angles.

In one implementation, a system for correcting an image rendered on a display for a target is disclosed. The system includes: an object tracking device to measure a relative position to the target; a configuration file including at least a list of target angles to rotate the display in relation to the relative position of the object tracking device; a measurement control system to ingest the configuration file, the measurement control system to initiate a sequence by tracking stability display while displaying a grey scale value of the target that is a basis for subsequent angular measurements; and a goniometric rotational device including a pair of servo motors to place a point of rotation on an axis aligned surface normal of the display.

In another implementation, a method for applying correction to an image rendered on a display is disclosed. The method includes: receiving calibration data including a luminance correction lookup table; receiving a target color space primaries and white point from a pole location, wherein the pole location is at a pole of hemisphere formed above the display; calculating a normalized primary matrix including tristimulus values using the target color space primaries and the white point; calculating a chromaticity correction using the normalized primary matrix; and calculating a luminance correction using RGB values of the display and the luminance correction lookup table.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, current lighting fixtures and direct display devices employing various wavelength LEDs in repetitive patterns face a substantial challenge including a marked chromaticity shift and luminance falloff when light propagates off-axis from the orientation of the LEDs. These off-axis deviations result in a noticeable and undesirable variance in the emitted light's color quality, as perceived by a target or as it illuminates the subject. Such chromaticity alterations not only affect the visual consistency and aesthetic appeal but also impact the functional effectiveness of these devices in applications where precise color representation is critical and preservation of the creative intent is the main priority. The above-described off-axis deviations may include chromaticity errors (or color errors) and/or luminance errors (or brightness errors), which may be caused by several different factors including geometrical and optical.

For example, geometrical factors include spatial separation of red-green-blue (RGB) LEDs. In RGB LED packages, red, green, and blue LEDs are spatially separated. When viewed off-axis, the distance that light from each LED travels to the target changes, and affects the color mixing. As the angle increases, the target sees less of the LED's light-emitting surface, which contributes to a decrease in perceived brightness. In extreme cases, the LED package may self-occlude sub-pixels which can have significant brightness loss or color mixing issues. The geometrical factors may also include a geometric effect related to the projected area of the light source as seen by the observer. That is, the perceived brightness of a light source decreases with the cosine of the angle between the observer's line of sight and the normal to the source (cosine law).

In another example, optical factors include an optical design of the LED package (including the lens or encapsulant) which is optimized for on-axis viewing. Thus, when viewed off-axis, the elements of the package may cause more scattering or absorption of light, which leads to decreased luminance. The optical factors may also include wavelength-dependent refractions. That is, different wavelengths of light (i.e., different colors) are refracted differently as the light passes through materials such as LED lens or any protective coverings. Thus, the refractions may cause different colors to spread or focus differently, which alters the perceived color balance at various angles.

To address the above-described issues with the deviations, implementations of the present disclosure provide an active off-axis color correction system that receives the location of a target and applies a correction to the rendered image. In one implementation, methods and systems are disclosed to dynamically correct lighting and display technologies of off-axis brightness and color errors. For example, methods and systems may model and dynamically correct displayed imagery deviations when the display is utilized as a light source to illuminate a subject or is photographed directly from varying angles. The methods and systems may apply to lighting and display technology, virtual production, location-based entertainment (LBE), and the media and entertainment industry. In one implementation, an imagery on a light fixture or LED display is utilized to light a target, be photographed directly, or viewed in sub-optimal conditions from a known target position.

The first function of the present disclosure is to dynamically correct chromaticity deviations as the target diverges from the optimal perpendicular viewing angle.

The second function of this disclosure is to compensate for the luminance falloff of the display as the target reaches the extents of the emission cone.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Features provided in various implementations may include, but are not limited to, one or more of the following items:

(a) measure and model the chromatic and brightness error of LED light sources from any point on a hemisphere from the surface normal to a display;
(b) pack a chromatic and brightness correction model into a 2-dimensional texture object for efficient sampling within a graphics pipeline;
(c) apply real-time error correction to the chromaticity of an input color value per-pixel on a LED fixture based on fixture location in relation to a dynamic target location; and
(d) apply real-time error correction to the brightness of an input color value per-pixel on an LED fixture based on fixture location in relation to a dynamic target location.

In one implementation, a correction system includes a display, an imaging device, and additional computer hardware and software to provide an image correction. The correction system may be a calibration and correction rendering system to resolve off axis color shift and brightness loss. In another implementation, an active off-axis color correction system receives the current location of a target (e.g., a subject that is being illuminated by the imagery on the display) and applies a correction (e.g., applied to ensure uniform lighting on the subject from multiple sources and directions) to the rendered image on the display. The system may receive any number of subject locations and interpolate between correction zones based on the user-defined radial distance or based on the inverse-square of the emission falloff. In a further implementation, the target may be a camera which is photographing the display and the correction is applied to ensure not only color and brightness uniformity from varying perspectives but also spectral linearity of the captured images. Thus, the correction system may be configured to solve non-uniformities faced by the media and entertainment industry when photographing display technology from glancing angles and lighting inconsistencies when using image-based lighting techniques on a subject.

Figure 1A:
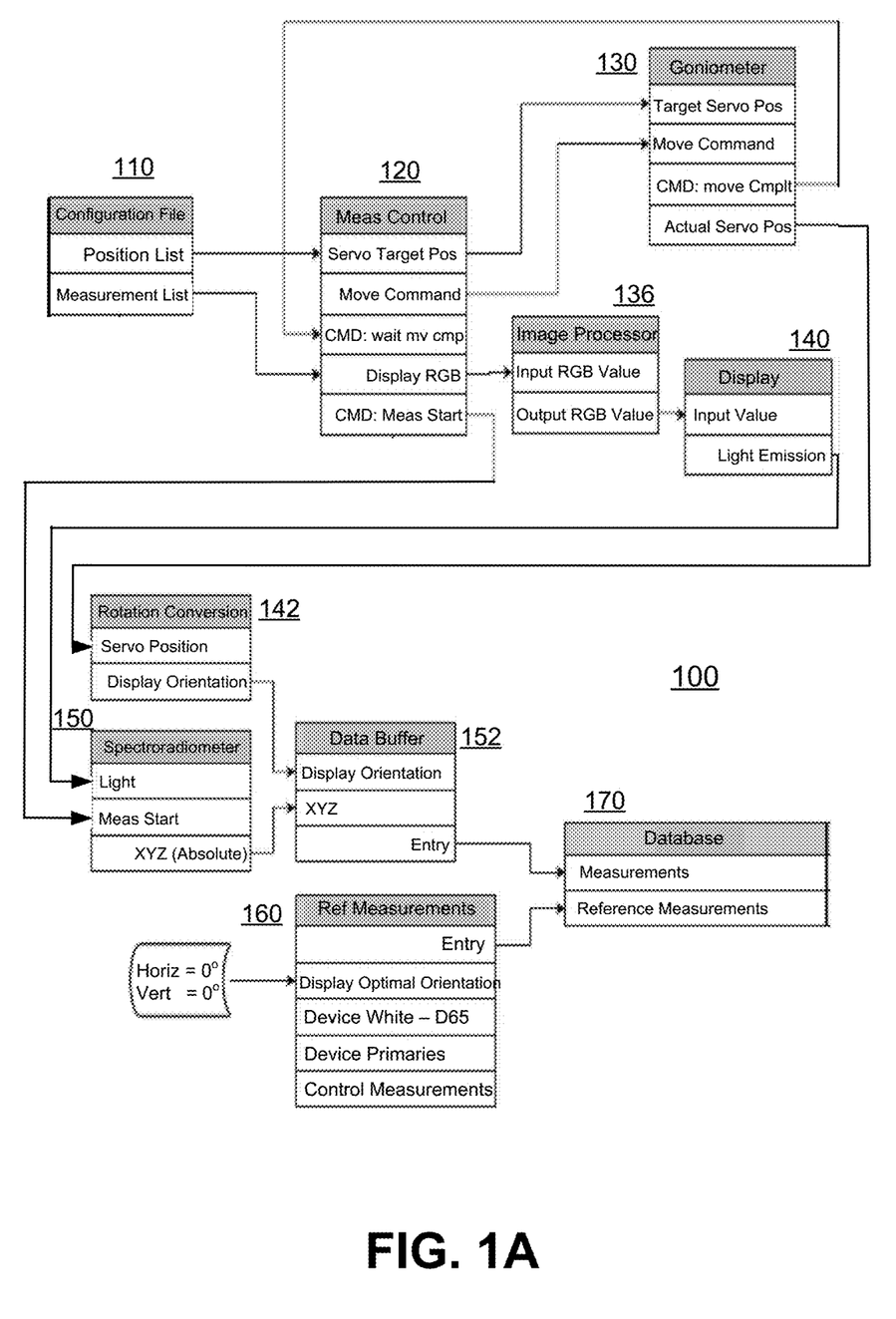
FIG. 1A is a block diagram of a correction system in accordance with one implementation of the present disclosure.

FIG. 1A is a block diagram of a correction system 100 in accordance with one implementation of the present disclosure. In one implementation, the correction system 100 is a calibration system. In one implementation, the correction system 100 includes a configuration file 110, a measurement control system 120, a goniometric rotational device 130, an image processor or input stage 136 of the Device Under Test (DUT) 140, a rotation converter 142, a spectroradiometer 150, a buffer 152 for storing current light and control measurements, reference measurements 160, and a database for storing a data file ready for analysis.

In the illustrated implementation of FIG. 1A, the system 100 uses absolute measurements of wavelength and amplitude of emitted light with corresponding horizontal and vertical viewing angles. Also, a device under test (DUT) may be referred to as a light fixture, display, or illumination device currently under calibration, while a measurement device (MD) may be referred to as a Spectroradiometer, Spectrophotometer, Tristimulus Colorimeter, Photometer, or a Digital Camera. Further, a reference position (RP) refers to a position in which the surface normal of the DUT is facing the MD and can be expressed as $\theta_h=0°$ or $\theta_h \wedge \theta_v=0°$.

In the illustrated implementation of FIG. 1A, a configuration file 110 including a list of instructions is initially prepared. The configuration file 110 includes: (a) a list of every target angle to rotate the DUT in relation to the fixed position spectroradiometer; (b) a list of angles sorted based on an optimized path to reduce travel time to each unique location; (c) relevant DUT and test condition metadata; and (d) RGB input values to the DUT including primaries and white point at the RP.

In one implementation, the configuration file 110 is ingested into a measurement control system 120 where a sequence is initiated by tracking the DUT stability while displaying the target grey scale value that is the basis for the subsequent angular measurements. The calibration sequence may begin once the light fluctuations have stabilized which means the DUT is at or near an optimal operating temperature. The spectral stability of the device over time is an important metric to track since the color performance may change as the DUT temperature increases or decreases. In one implementation, the correction system employs an initial stabilization phase to determine the optimal calibration brightness and "warm up" duration for the device to stabilize at a target greyscale value before data capturing may commence.

In the illustrated implementation of FIG. 1A, a high precision goniometric rotational device 130 is used to maximize angular accuracy and automate the collection of large datasets pertaining to light emission angle variation of the display/DUT 140. The goniometric rotational device 130 is equipped with two servo motors (one to rotate the base (yaw) and another to rotate the DUT (roll); see FIG. 1B) to place a point of rotation precisely on the DUT's axis aligned surface normal. Assuming the axis of rotation is substantially or perfectly aligned to a known location on the surface of the DUT from the MD, then a gimbal with sufficient Programmable Logic Controller (PLC) precision can orient the DUT along 2-DOF (degrees of freedom) to enable a complete hemispherical data set.

In the illustrated implementation of FIG. 1A, reference measurements 160 include: Red, Green, Blue primary measurements at reference position with ambient light control measurements after each primary; and target white at a reference position followed by an ambient light control measurement. In FIG. 1A, angular light measurements include: (a) an optimized position list used to send servo motor position values to both axes; (b) a control message received when the servo motors have reached the target position; (c) a target RGB value is provided and correctly formatted for the vendor-specific image processor or input stage 136 of the DUT; (d) a command issued to the spectroradiometer 150 to begin the measurement of the position of the target; (e) a callback issued when the measurement is complete; (f) a black RGB value sent to the DUT for an optional ambient light control measurement; (g) a command issued to the spectroradiometer 150 to begin the control measurement; (h) a callback issued when the measurement is complete; (i) light and control measurements entered into a buffer 152 with current angular value that is converted to a common orientation using a rotation converter 142 and a timestamp; and (j) the next position loaded. In FIG. 1A, the database 170 includes data file ready for analysis.

In another implementation, the correction system 100 (which uses existing DUTs installed in the intended locations) includes an object tracking system, a spectroradiometer or Measurement Device (MD), and a laser imaging, detection, and ranging (LiDAR) device. In this implementation, the system 100 uses a "calibrate-in-place (CIP)" approach, where an existing lighting volume including at least one of the same DUT may be calibrated using a spectrometer and the existing object tracking system within the lighting volume. Initially, the location and orientation of an optical nodal point of the MD relative to the surface of the display is determined to substantially reduce any inaccuracies which may lead to poor correction results. This approach may require additional LiDAR devices to ensure millimeter accuracy of the DUTs in a single world coordinate system. Once the geometry of the DUTs is resolved in relation to the optical tracking origin, the precise location and forward vector of the MD may be calculated.

In both implementations, the MD shares the same relative coordinates of the display. In one implementation, an application receives the transformations and computes the angle between devices in the cartesian x/y plane. These coordinates may then be queried by a secondary application responsible for writing spectral measurements to a database. In one implementation, the calibration data may then be sorted. Accordingly, during the calibration process performed by the correction system 100, a target RGB color space may be defined based on the native primaries and white point of the DUT from an optimal viewing angle.

Figure 1B:
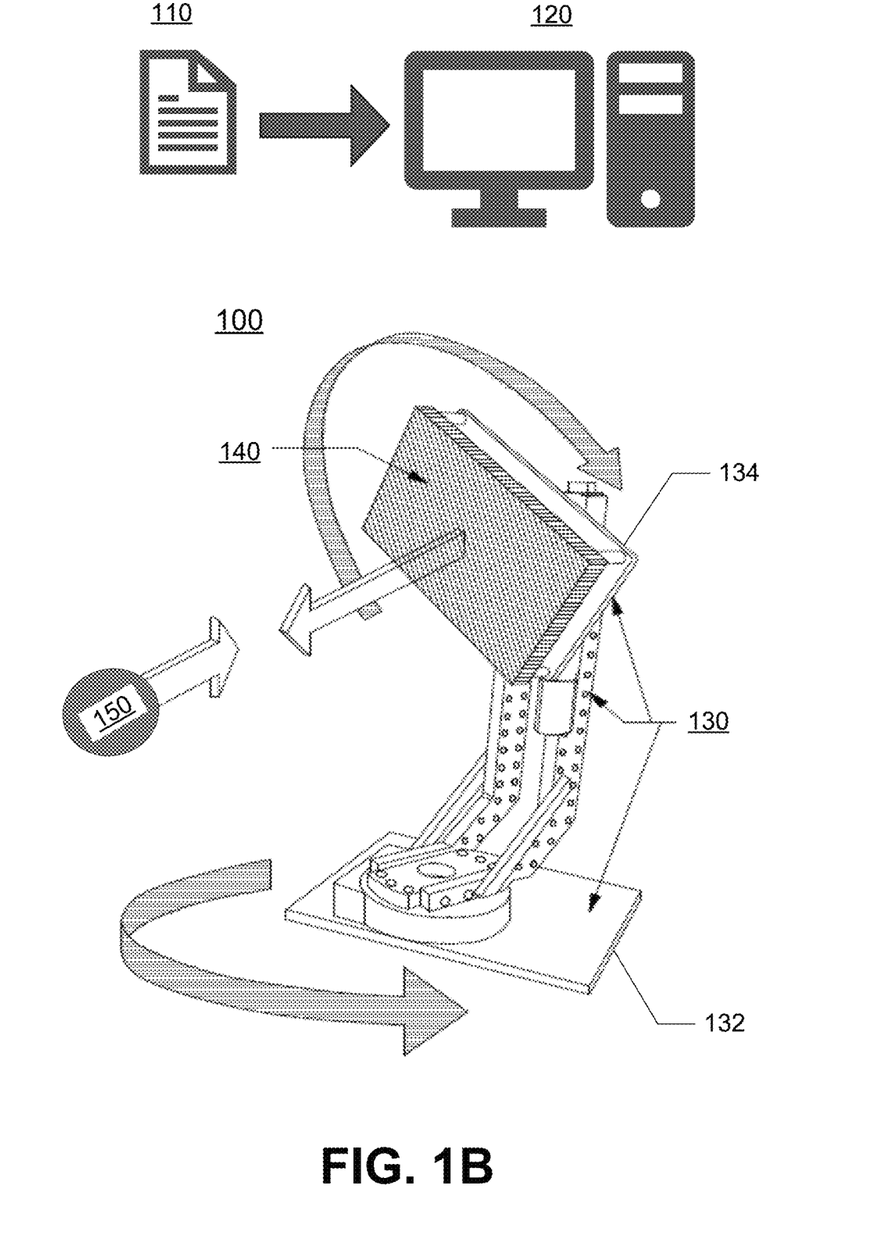
FIG. 1B is a pictorial depiction of the correction system in accordance with one implementation of the present disclosure.

FIG. 1B is a pictorial depiction of the correction system in accordance with one implementation of the present disclosure. In the illustrated implementation of FIG. 1B, the correction system 100 shows at least the configuration file 110, the measurement control system 120, the goniometric rotational device 130, the DUT 140, and the spectroradiometer 150.

As described above, the configuration file 110 includes: (a) a list of every target angle to rotate the DUT 140 in relation to the fixed position spectroradiometer 150; (b) a list of angles sorted based on an optimized path to reduce travel time to each unique location; (c) relevant DUT and test condition metadata; and (d) RGB input values to the DUT 140 including primaries and white point at the RP. The configuration file 110 is then ingested into the measurement control system 120 where a sequence is initiated by tracking the stability of the DUT 140 while displaying the target grey scale value that is the basis for the subsequent angular measurements. The calibration sequence may begin once the light fluctuations have stabilized which means the DUT 140 is at or near an optimal operating temperature. The spectral stability of the device over time is an important metric to track since the color performance may change as temperatures increase.

In the illustrated implementation of FIG. 1B, the goniometric rotational device 130 is used to maximize angular accuracy and automate the collection of large datasets pertaining to light emission angle variation of the DUT 140. The goniometric rotational device 130 is equipped with two servo motors (one to rotate the base (yaw) 132 and another to rotate the DUT (roll) 134) to place a point of rotation precisely on the DUT's axis aligned surface normal. Assuming the axis of rotation is substantially or perfectly aligned to a known location on the surface of the DUT from the MD, then a gimbal with sufficient Programmable Logic Controller precision can orient the DUT along 2-DOF (degrees of freedom) to enable a complete hemispherical data set.

Figure 2:
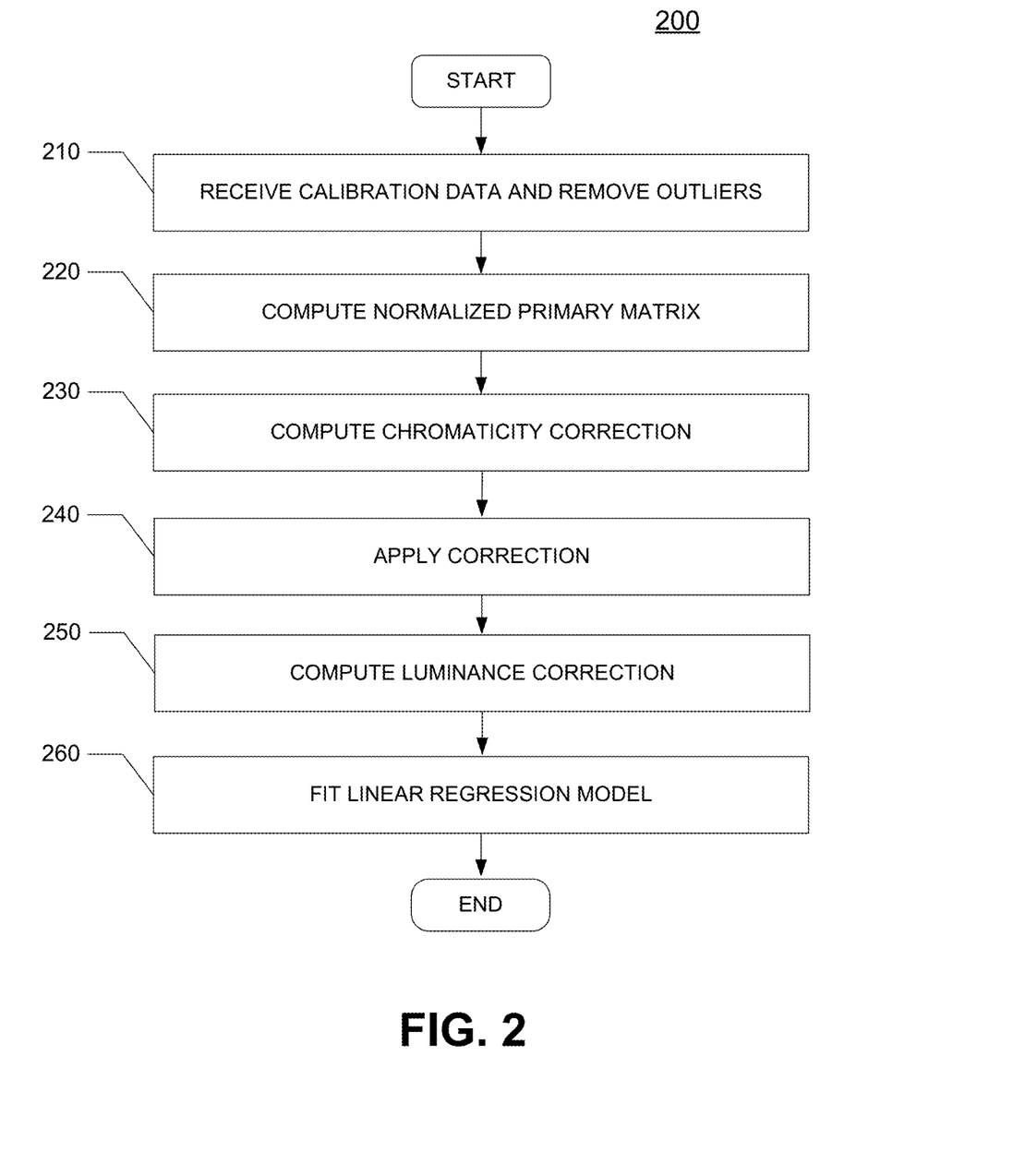
FIG. 2 is a flow diagram of a correction process in accordance with one implementation of the present disclosure.

FIG. 2 is a flow diagram of a correction process 200 in accordance with one implementation of the present disclosure. In the illustrated implementation of FIG. 2, the correction process 200 receives (from the calibration database) the calibration data calibrated by the correction system 100, at step 210, and removes any outliers within a given threshold. At step 220, a normalized primary matrix (MX) is calculated. In one implementation, MX is calculated by receiving the target color space primaries and white point from the pole location (i.e., the center of the display) of the hemisphere as follows:

$$MX = \begin{bmatrix} rx & gx & bx \\ ry & gy & by \\ rz & gz & bz \end{bmatrix}^{-1} \left(\frac{1}{w_y}\right) w_{xyz},  \quad [1]$$

MX is normalized primary matrix,
$W_{xyz}$ is tristimulus value of white point,
$W_y$ is luminance (y component) of white point,
[ ] is xyz values of Red Green Blue primaries.

Figure 3:
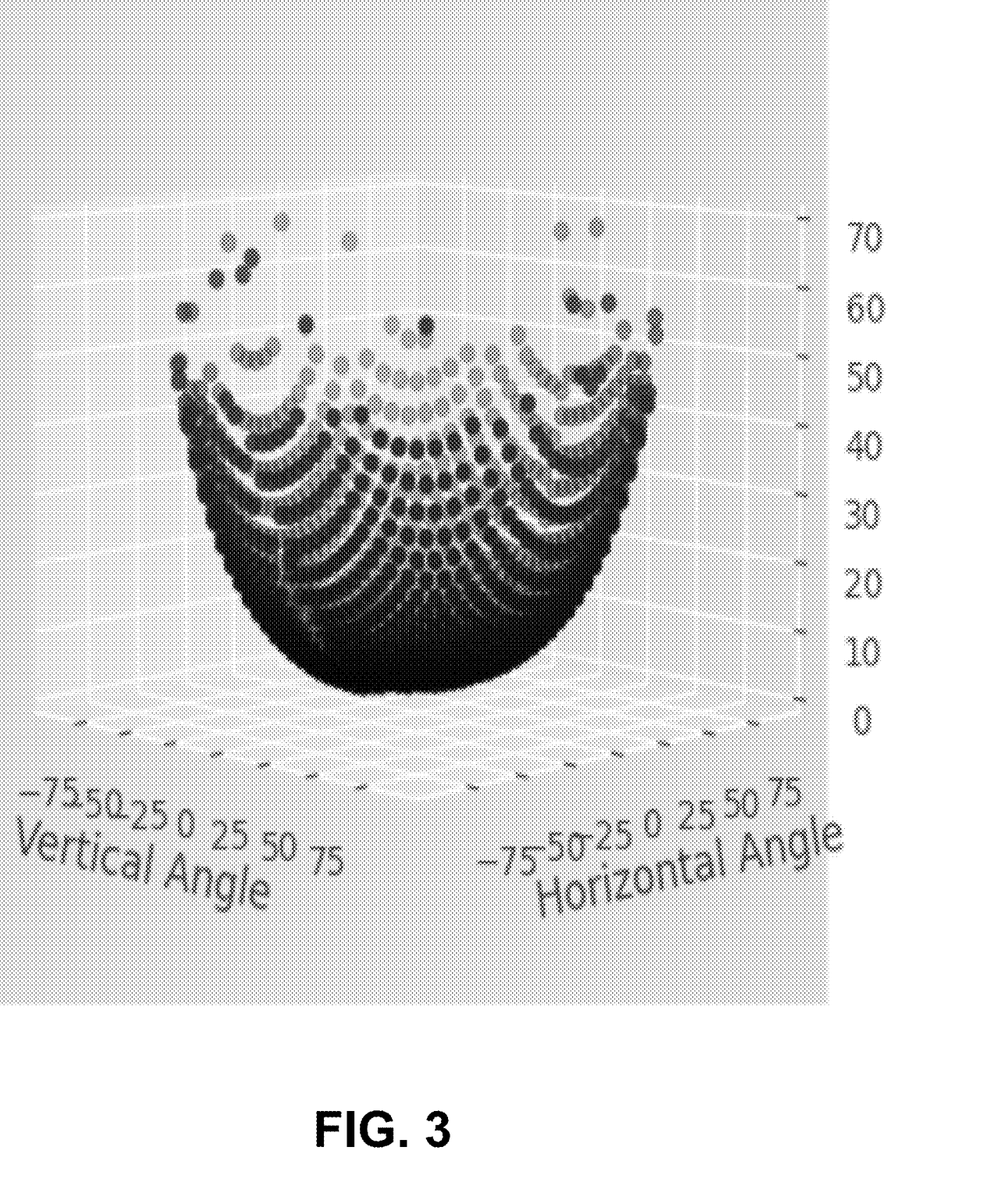
FIG. 3 shows one example of ΔE ITP Error for a hemisphere of samples in accordance with one implementation on the present disclosure.

FIG. 3 shows one example of $\Delta E_{ITP}$ (Delta Empfindung ITP) Error for a hemisphere of samples in accordance with one implementation on the present disclosure. The V axis represents the vertical angle; the H axis represents the horizontal angle; and the vertical axis represents the $\Delta E_{ITP}$ value. A point where both horizontal angle and vertical angle are zero represents the center of the display.

Figure 4:
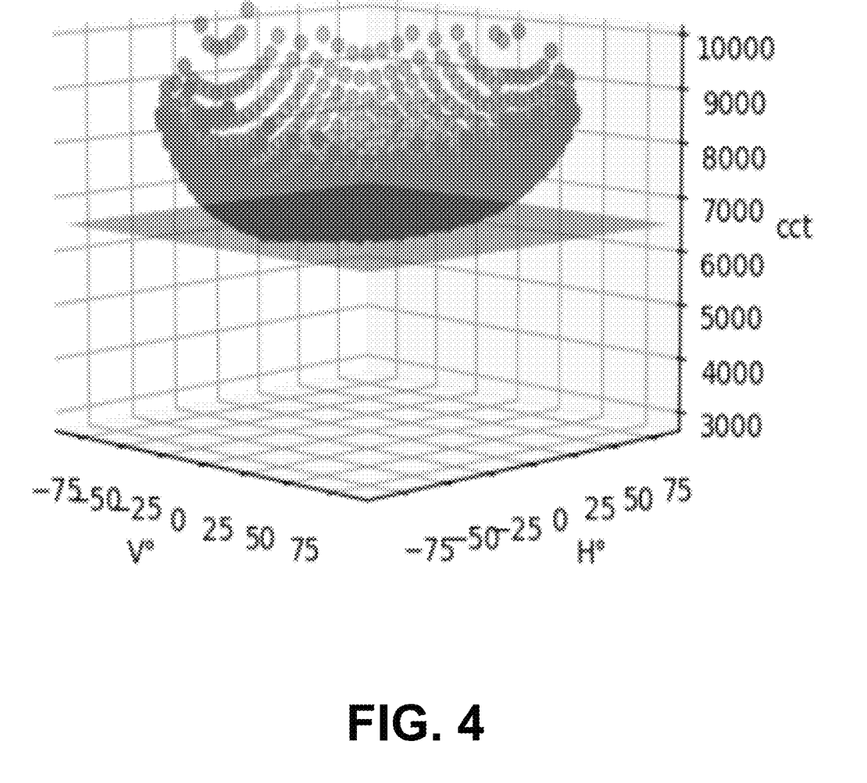
FIG. 4 shows real-world off-axis color correlated temperature measurements of a device with a plane at 6504 Kelvin representing the correction target in accordance with one implementation on the present disclosure.

FIG. 4 shows real-world off-axis color correlated temperature measurements of a device with a plane at 6504 Kelvin representing the correction target in accordance with one implementation on the present disclosure. The V axis represents the vertical angle; the H axis represents the horizontal angle; and the vertical axis represents the Correlated Color Temperature (CCT) in Kelvin degrees.

At step 230, a chromaticity correction ratio (CX) is calculated by transforming the XYZ tristimulus values of MX from the radial coordinate along the polar axis to RGB axis as follows:

$$CX_{rgb} = MX^{-1} \begin{bmatrix} \theta x \\ \theta y \\ \theta z \end{bmatrix}, \quad [2]$$

CX is chromaticity correction ratio,
$\theta_{xyz}$ is xyz of polar axis.

In one implementation, the correction ratio (CX) is applied, at step 240, as follows:

$$\text{output}_{rgb} = \begin{bmatrix} CX_r \\ CX_g \\ CX_b \end{bmatrix} \begin{bmatrix} \text{input}_r \\ \text{input}_g \\ \text{input}_b \end{bmatrix}. \quad [3]$$

In one implementation, this correction is applied to linear RGB values prior to any luminance or encoding transformations.

In one implementation, the correction system 100 independently calculates a luminance correction scalar (LF), at step 250, which is then interpolated across the alpha channel of the correction lookup table as follows:

$$LF = \frac{\max(Y_n)}{Y_i}. \quad [4]$$

The luminance correction may be applied by either using the absolute XYZ measured values in the above method or using normalized xyY data.

In another implementation, the correction system 100 calculates the luminance correction, at step 250, by fitting a polynomial, at step 260. In one implementation, Linear Least Squares (LLS) is used to fit the polynomial.

The system 100 calculates the luminance correction (lf (x)) by solving a 1-D normalized luminance correction factor as follows:

$$lf(x) = (a_0 x^4 + a_1 x^3 + a_2 x^2 + a_3 x + c)/c. \quad [5]$$

In one implementation, the calculated luminance correction is applied by limiting to half or double the amount as follows:

$$\text{output}_{rgb} = \frac{\text{input}_{rgb}}{\max\left(\frac{\text{peak}}{2}, \min(lf, \text{peak} \cdot 2)\right)}. \quad [6]$$

In one implementation, the correction system 100 precomputes the luminance and chromaticity correction by fitting the RGB correction ratios and brightness scaling ratios across the cartesian plane and stores the data with floating point precision in an array. In another implementation, the correction system 100 stores the array of correction values in an image file (e.g., by using the open source OpenEXR format) to pack correction values into an uncompressed image file. The resulting image is then wrapped as a Shader-Resource-View (SRV) with the correct formatting (e.g., R16G16B16A16_FLOAT). Once it is bound, it can be sampled in the graphics application stage which applies the correction.

In one implementation, the current correction UV coordinates may be calculated in the vertex shader stage by comparing the location of the target and the display surface coplanar unit vectors as follows:

$$\angle ab = (vtx_b - \vec{a}) \cdot \hat{b}. \quad [7]$$

The normalized angular values may then be used to look up the appropriate RGB and the luminance correction ratio from the bound Correction Shader-Resource-View (SRV) and apply the values to the source RGB input. The chromaticity and luminance corrected values may also be interpolated with uncorrected values using a user-defined amount of correction to be applied.

Figure 5:
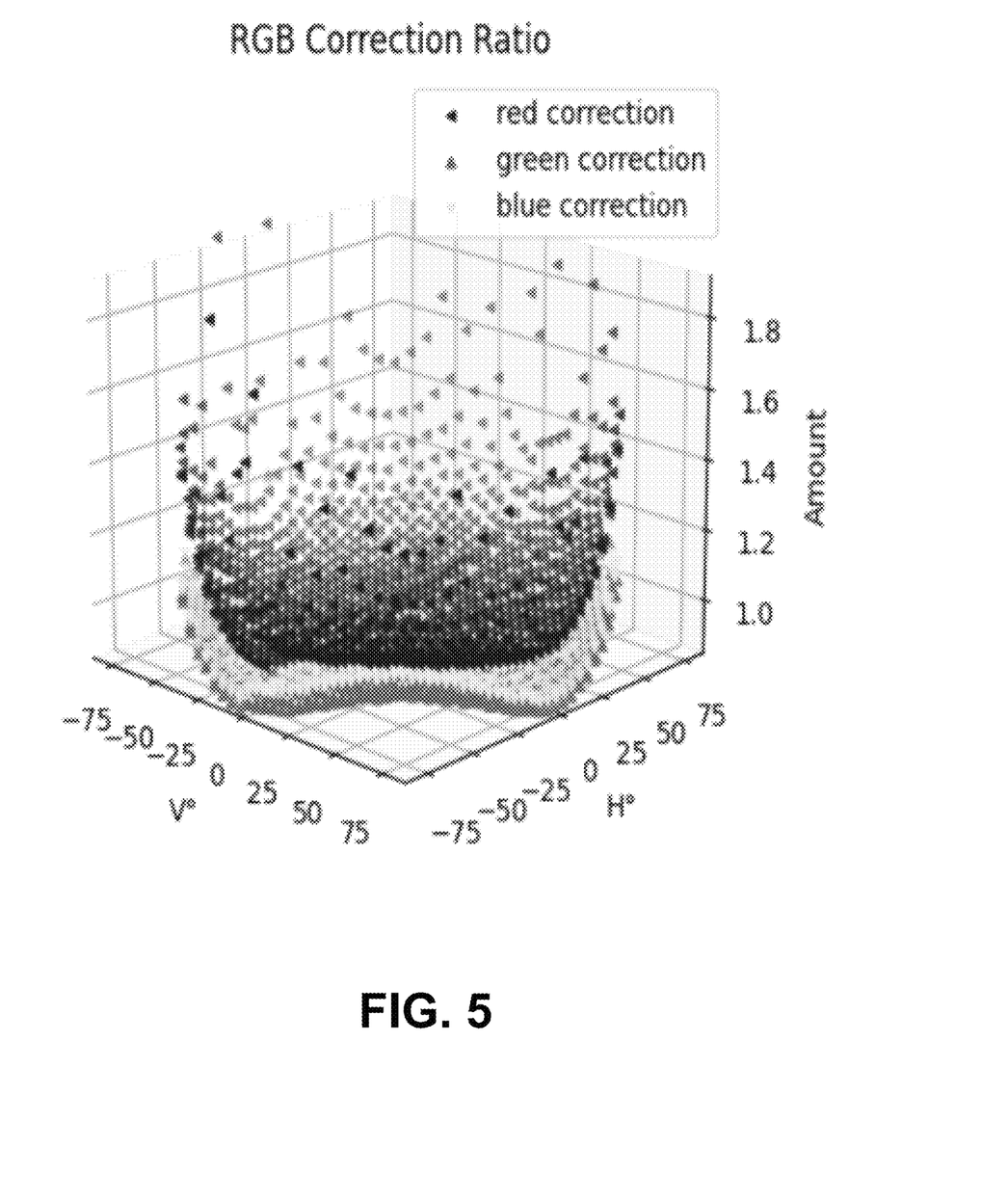
FIG. 5 shows the RGB correction ratio required to correct a device that shifts to cyan off-axis in accordance with one implementation on the present disclosure.

FIG. 5 shows the RGB correction ratio required to correct a device that shifts to cyan off-axis (seen in FIG. 4) in accordance with one implementation on the present disclosure. The V axis represents the vertical angle; the H axis represents the horizontal angle; and the vertical axis represents the RGB correction ratio.

Figure 6:
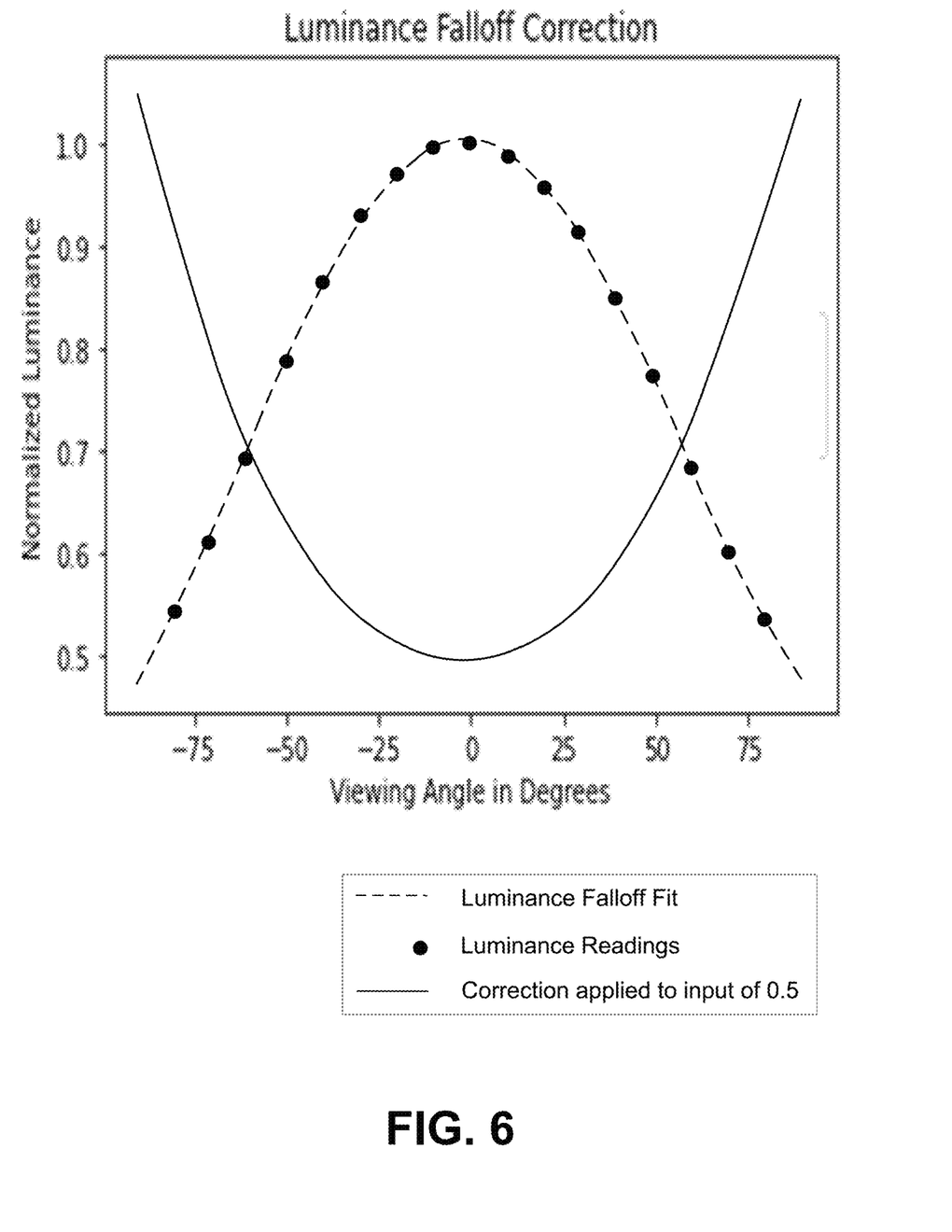
FIG. 6 shows normalized luminance values before and after correction shown in accordance with one implementation on the present disclosure.

FIG. 6 shows normalized luminance values before and after correction shown in accordance with one implementation on the present disclosure.

Figure 7:
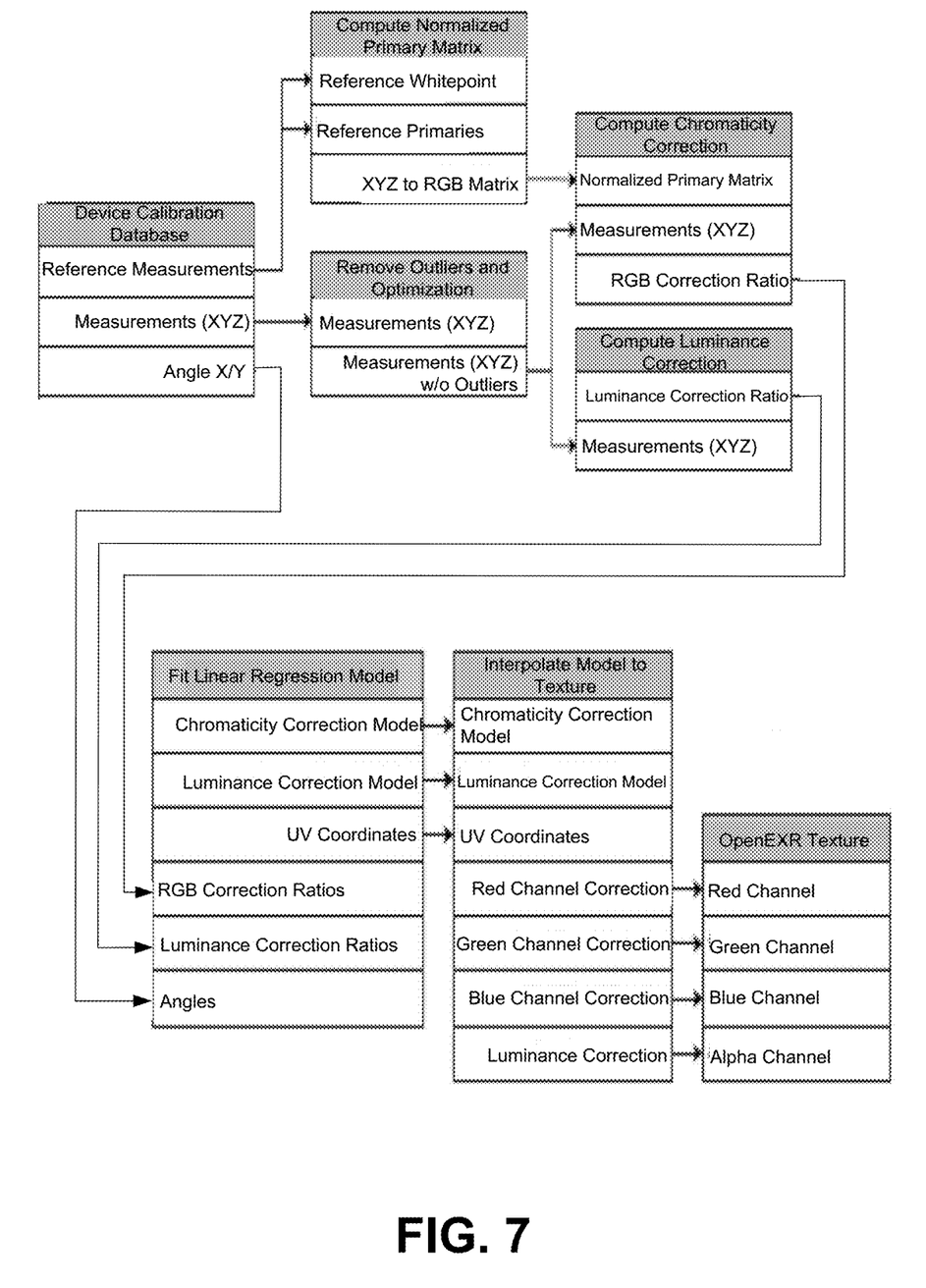
FIG. 7 is a flow diagram of a detailed view of the correction process in accordance with one implementation of the present disclosure.

FIG. 7 is a flow diagram of a detailed view of the correction process 200 in accordance with one implementation of the present disclosure.

In one particular implementation, a system for correcting an image rendered on a display for a target is disclosed. The system includes: an object tracking device to measure a relative position to the target; a configuration file including at least a list of target angles to rotate the display in relation to the relative position of the object tracking device; a measurement control system to ingest the configuration file, the measurement control system to initiate a sequence by tracking stability display while displaying a grey scale value of the target that is a basis for subsequent angular measurements; and a goniometric rotational device including a pair of servo motors to place a point of rotation on an axis aligned surface normal of the display.

In one implementation, the object tracking device is a spectroradiometer. In one implementation, the configuration file includes a list of instructions including: a list of angles sorted based on an optimized path to reduce travel time to each location on the display; and a plurality of RGB input values to the display. In one implementation, the plurality of RGB input values includes primaries and white point at a reference position, wherein the reference position is a position in which the surface normal of the display is facing the object tracking device. In one implementation, the pair of servo motors of the goniometric rotational device includes: a first servo motor to rotate a base; and a second servo motor to rotate the display to place a point of rotation precisely on the axis aligned surface normal of the display. In one implementation, the system further includes a gimbal with programmable logic controller precision to orient the display along 2-DOF to enable a hemispherical data set. In one implementation, the system further includes an image processor of the display to process an RGB value of the target. In one implementation, the system further includes a rotation converter to convert an angular value to a common orientation; and a buffer to store the converted angular value. In one implementation, the system further includes a plurality of reference measurements including: RGB primary measurements at a reference position; and target white at the reference position followed by a light control measurement. In one implementation, the light control measurement includes: an optimized position list used to send position values to both yaw and roll axes of the pair of servo motors; a control message received when the pair of servo motors has reached the relative position to the target; and a command issued to the object tracking device to begin measurement of the relative position of the target. In one implementation, the object tracking device is a laser imaging, detection, and ranging (LiDAR) device.

In another particular implementation, a method for applying correction to an image rendered on a display is disclosed. The method includes: receiving calibration data including a luminance correction lookup table; receiving a target color space primaries and white point from a pole location, wherein the pole location is at a pole of hemisphere formed above the display; calculating a normalized primary matrix including tristimulus values using the target color space primaries and the white point; calculating a chromaticity correction using the normalized primary matrix; and calculating a luminance correction using RGB values of the display and the luminance correction lookup table.

In one implementation, the method further includes removing outliers from the calibration data within a given threshold. In one implementation, the method further includes transforming the tristimulus values of the normalized primary matrix from radial coordinates to polar coordinates. In one implementation, the method further includes applying the chromaticity correction to RGB values of the display. In one implementation, calculating the luminance correction includes: fitting a polynomial using linear least squares; and solving a 1-D normalized luminance correction factor. In one implementation, the method further includes applying the luminance correction by limiting to half or double correction ratios of the RGB values of the DUT. In one implementation, the method further includes precomputing the luminance correction by fitting the correction ratios and luminance factors across a cartesian plane.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

One implementation includes one or more programmable processors and corresponding computer system components to store and execute computer instructions, such as to provide the calibration and correction.

Additional variations and implementations are also possible. For example, in addition to entertainment applications, implementations can be applied in other fields such as gaming, medical and life science, and education. In one such example, correction can be applied to facilitate display of medical imaging for discussion and treatment.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for correcting an image rendered on a display for a target, the system comprising:
   an object tracking device to measure a relative position to the target;
   a configuration file including at least a list of target angles to rotate the display in relation to the relative position of the object tracking device;
   a measurement control system to ingest the configuration file, the measurement control system to initiate a sequence by tracking stability of the display while displaying a grey scale value of the target that is a basis for subsequent angular measurements; and
   a goniometric rotational device including a pair of servo motors to place a point of rotation on an axis aligned surface normal of the display.

2. The system of claim 1, wherein the object tracking device is a spectroradiometer.

3. The system of claim 1, wherein configuration file includes a list of instructions including:
   a list of angles sorted based on an optimized path to reduce travel time to each location on the display; and
   a plurality of RGB input values to the display.

4. The system of claim 3, wherein the plurality of RGB input values includes primaries and white point at a reference position,
   wherein the reference position is a position in which the surface normal of the display is facing the object tracking device.

5. The system of claim 1, wherein the pair of servo motors of the goniometric rotational device includes:
   a first servo motor to rotate a base; and
   a second servo motor to rotate the display to place a point of rotation precisely on the axis aligned surface normal of the display.

6. The system of claim 1, further comprising
   a gimbal with programmable logic controller precision to orient the display along two degrees of freedom (2-DOF) to enable a hemispherical data set.

7. The system of claim 1, further comprising:
   an image processor of the display to process an RGB value of the target.

8. The system of claim 1, further comprising:
   a rotation converter to convert an angular value to a common orientation; and
   a buffer to store the converted angular value.

9. The system of claim 1, further comprising
   a plurality of reference measurements including:
   RGB primary measurements at a reference position; and
   target white at the reference position followed by a light control measurement.

10. The system of claim 9, wherein the light control measurement includes:
    an optimized position list used to send position values to both yaw and roll axes of the pair of servo motors;

a control message received when the pair of servo motors has reached a relative position to the target; and a command issued to the object tracking device to begin measurement of the relative position of the target.

11. The system of claim 1, wherein the object tracking device is a laser imaging, detection, and ranging (LiDAR) device.

12. A method for applying correction to an image rendered on a display, the method comprising:
   receiving calibration data including a luminance correction lookup table;
   receiving a target color space primaries and white point from a pole location,
   wherein the pole location is at a pole of hemisphere formed above the display;
   calculating a normalized primary matrix including tristimulus values using the target color space primaries and the white point;
   calculating a chromaticity correction using the normalized primary matrix;
   calculating a luminance correction using RGB values of the display and the luminance correction lookup table.

13. The method of claim 12, further comprising
   removing outliers from the calibration data within a given threshold.

14. The method of claim 12, further comprising
   transforming the tristimulus values of the normalized primary matrix from radial coordinates to polar coordinates.

15. The method of claim 12, further comprising
   applying the chromaticity correction to RGB values of the display.

16. The method of claim 12, wherein calculating the luminance correction by solving a polynomial using linear least squares.

17. The method of claim 12, further comprising
   applying the luminance correction by limiting to half or double correction ratios of the RGB values of the display.

18. The method of claim 17, further comprising
   precomputing the luminance correction by fitting the correction ratios and luminance factors across a cartesian plane.

* * * * *